(12) United States Patent
Shimotomai

(10) Patent No.: US 6,367,530 B1
(45) Date of Patent: Apr. 9, 2002

(54) CONVEYOR APPARATUS FOR LAMINATOR

(75) Inventor: Mitsuhiro Shimotomai, Aichi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/386,417

(22) Filed: Aug. 31, 1999

(30) Foreign Application Priority Data

Sep. 4, 1998 (JP) .......................................... 10-265764

(51) Int. Cl.$^7$ .............................................. B32B 31/00
(52) U.S. Cl. .................... 156/382; 156/580; 156/583.1; 156/583.3; 156/583.5
(58) Field of Search ................................ 156/381, 382, 156/498, 580, 583.1, 583.3, 583.5

(56) References Cited

U.S. PATENT DOCUMENTS

| | | | | |
|---|---|---|---|---|
| 3,580,795 A | * | 5/1971 | Eighenlaub | 156/285 |
| 3,738,890 A | * | 6/1973 | Johnson et al. | 100/326 |
| 3,964,958 A | * | 6/1976 | Johnson | 156/285 |
| 4,067,764 A | * | 1/1978 | Walker et al. | 156/267 |
| 4,445,025 A | * | 4/1984 | Metz | 156/499 |
| 5,126,000 A | * | 6/1992 | Takai et al. | 156/285 |
| 5,578,158 A | * | 11/1996 | Gutowski et al. | 156/285 |
| 5,593,532 A | * | 1/1997 | Falk et al. | 156/285 |

FOREIGN PATENT DOCUMENTS

JP   9-141743 A   *   6/1997

* cited by examiner

Primary Examiner—James Sells
(74) Attorney, Agent, or Firm—Duane Morris LLP

(57) ABSTRACT

The present invention is a conveyor apparatus for conveying a multilayer material to be processed, used in a laminator having an upper chamber and a lower chamber partitioned by a diaphragm with or without a heating device disposed in the lower chamber, wherein a conveying belt is disposed under the multilayer material to pass through only two side edges of all four side edges of each chamber opposed to each other along a conveying direction of the multilayer material. Accordingly, the multilayer material can be conveyed in a reasonable manner without injuring a laminating function by the conveyor apparatus in the laminator.

21 Claims, 16 Drawing Sheets

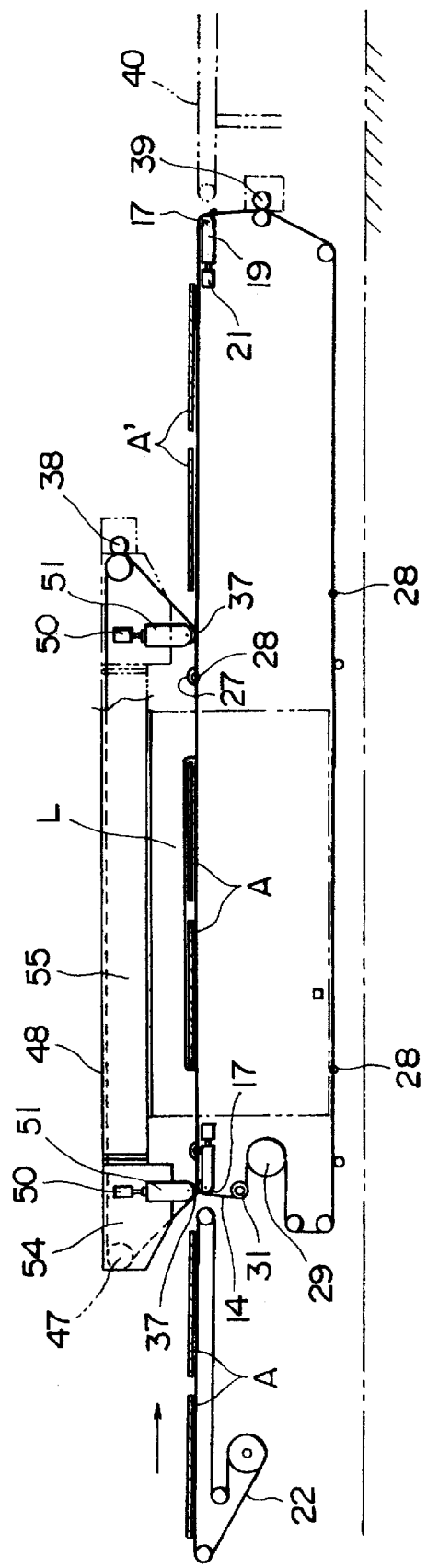

US 6,367,530 B1

CONVEYOR APPARATUS FOR LAMINATOR

BACKGROUND OF THE INVENTION

1. Field of the Invention

The present invention relates to a conveyor apparatus for conveying a multilayer material to be processed in a laminator for manufacturing a photovoltaic modules or the like.

2. Description of the Related Art

As a laminator for manufacturing a photovoltaic modules, there has been one disclosed in Japanese Paten Application Laid-Open No. 9-14743 or Japanese Utility Model No. 3037201. A conventional laminator generally includes an upper chamber having a diaphragm expandable downwardly and a lower chamber having a heating plate. In the laminator, a multilayer material to be processed where a glass plate is placed as the lowermost layer, a sheet-like filler, photovoltaic modules and another sheet-like filler are sequentially stacked on the glass plate, and a sheet-like backing member is disposed at the uppermost portion is placed on the heating plate. Then, the upper chamber and the lower chamber are pressure-reduced and the multilayer material is heated. The air or atmosphere is introduced into the upper chamber so that the multilayer material is sandwiched between an upper face of the heating plate and the diaphragm to be laminated with pressure.

In the above, in order to prevent air void from remaining in the workepiece, the pressure-reduction, namely evacuation, is conducted on the upper chamber and the lower chamber. The reason is because, when the solar panel including the remaining air void is exposed to sunlight and its temperature rises, the air void are expanded to accelerate degradation of the photovoltaic modules.

Also, the multilayer material is heated by the heating plate while the temperature of the heating plate is being controlled to a set temperature. After an appropriate time period lapses, the temperature of the multilayer material becomes approximately equal to the temperature of the heating plate. Therefore, when the set temperature is a temperature above the melting point of the filler, the filler melts, and the air is introduced into only the upper chamber so that the diaphragm is inflated downwardly to press the multilayer material on the heating plate, thereby laminating the multilayer material. After the multilayer material is bound, the lower chamber is restored to the atmospheric pressure by opening a lid, and the multilayer material is conveyed out.

On the other hand, EVA (ethylene-vinyl-acetate) resin is used as the filler. When the EVA resin is used, it melts at about 80° C. to 100° C. Therefore, in the laminator, the resin is melted at a temperature above the above temperature range and it is bound with pressure. However, since the resin obtained by such a laminating is unstable, it must be cured. Condition for cure varies depending on property of the resin. In the EVA resin, it is properly cured when it is held at about 150° C. for several minutes to 20 minutes. Thus, since such a long time period is required for cure, the curing step is often performed in another oven apparatus or a conveyor furnace.

The size of the above filler is generally larger than that of the lowermost glass layer of the multilayer material by several millimeters, which is for securing a sealing performance at end faces of the multilayer material. With such a configuration, a portion of the filler overflowing from the glass layer sticks on the heating plate and, when the next multilayer material is conveyed into the laminator, the overflowed portion of the filler sticks on a lower face of the glass layer thereof so that it becomes difficult to remove the filler stuck from the lower face. There is a method where two sheets (hereinafter referred to as release sheet) having a high peeling-off property are prepared as means for preventing such sticking and the multilayer material which has been sandwiched between the two sheets is carried into the laminator.

A glass cloth sheet which has been immersed in fluoric resin is useful as the release sheet, and the EVA resin can be removed from the glass cloth sheet, even when it sticks on the glass cloth sheet. The aforesaid conventional technique or apparatus does not have a function serving as the release sheet, and therefore it still has a drawback that the overflowed filler sticks on the heating plate or the diaphragm in the chambers, thereby remaining therein. Also, when the release sheets are used and the multilayer material which has been sandwiched therebetween is conveyed, additional works of covering the multilayer material with the release sheets, peeling off these sheets from the multilayer material, and removing the stuck filler from the release sheets are required. These works are laborious and increase the manufacturing costs.

SUMMARY OF THE INVENTION

In view of the above conventional technique, an object of the present invention is to provide a conveyor apparatus which has a release sheet function and conveys a multilayer material to be processed in a reasonable manner without reducing a laminating function in a laminator.

The present invention which has been achieved in order to solve the above problems is a conveyor apparatus for conveying a multilayer material to be processed in a laminator, including an upper chamber and a lower chamber partitioned by a diaphragm with or without a heating device disposed in the lower chamber, wherein a conveying belt is disposed under the multilayer material such that the conveying belt passes across only two side edges of all four side edges of each chamber opposed to each other along a direction of conveyance of the multilayer material.

That is, the present invention is configured in a laminator having an upper chamber partitioned and formed by a diaphragm mounted to a lid of a vacuum vessel and a lower chamber defined in the vacuum vessel itself such that a belt is used as conveying means and the belt passes across only two side edges of all four edges of each chamber opposed to each other along a direction of conveyance of the multilayer material. Therefore, when the lid of the vacuum vessel is closed, portions of the belt positioned across the two side edges of the chamber is held or sandwiched between the lid and the vacuum vessel. However, since two longitudinal side edges of the belt corresponding to the remaining side edges of the chamber are not held between the lid and the vacuum vessel, gas can flow through the two longitudinal side edges of the belt which does not be sandwiched. When evacuation is performed on the lower chamber of the vacuum vessel, gas (air) included in the multilayer material on the belt can be removed, namely the multilayer material can be degassed. The portions of the belt which have been sandwiched between the lid and the vacuum vessel are put across a sealing member for the upper chamber and the lower chamber. However, the flexibility and the compression amount of the sealing member, and the thickness of the belt are set properly, so that the air flowing in the lower chamber through these portions can be restricted to an extent where laminating processing can be performed properly. The compression amount of the sealing member is about several millimeters and the thickness of the belt is in a range of about 0.1 to 0.5 mm. Also, it is preferable that the material of the belt is the same as that of the above release sheet.

It is preferable to use a belt separably connected in a loop configuration at one portion or more as the conveying belt. This is for the fact that, though the filler often overflows from the multilayer material to stick on the belt and the stuck filler is removed from the belt after the laminating processing, it is required to exchange the belt which has been injured according to repetition of the removing work. Therefore, with the separable configuration, only a portion of the belt which has been injured can be exchanged, which is economical.

In a laminator provided with a heating device, a multilayer material to be processed is generally subjected to evacuation, heating and laminating with pressure, but the filler overflowing from the multilayer material sticks on the belt at a time of the processing, as described above. However, since the overflowed filler is soft and has adhering force during its hot state, it is difficult to peel off the multilayer material from the belt. When the filler is cooled in a certain degree, it is solidified and the multilayer material becomes easy to be peeled off. Accordingly, in the present invention, a section where the multilayer material can be naturally cooled is provided on the conveying-out side of the belt.

A sealing member is mounted on at least one of the faces of the lid and the vacuum vessel of the laminator contacting with each other in order to prevent gas flow. An upper face of the heating device is put at a position slightly above the sealing member so that the conveying belt slides on the upper face of the heating device. This configuration is for preventing abrasion of the sealing member from occurring due to driving of the belt. In this case, however, when the lid is closed while the belt is being tensioned, the belt is further stretched due to that the upper face of the heating device is high, thereby imparting an excessive tension on the belt to injure the belt. In order to overcome this drawback, a plurality of rollers is provided in the present invention and at least one of the rollers can be moved by an actuator so that the lid is closed in a loosened state of the belt. Accordingly, the belt is prevented from being injured.

Also, the present invention is configured such that a covering belt similar to the conveying belt covers an upper face of the multilayer material to provide an upper side release sheet function, in addition to a release sheet function provided to a lower face of the multilayer material by the conveying belt. With such a configuration, the filler overflowing from a backing member sticks on the covering belt by covering the upper portion of the multilayer material with the covering belt so that it can be prevented from sticking on the diaphragm, though there is a possibility that, when the multilayer material is heated and pressured, the filler overflows from the backing member to stick on the diaphragm due to positional error occurring when the multilayer material is prepared by stacking before laminating processing is effected, positional error in the stacked members in the multilayer material occurring when the multilayer material is carried into the laminator, and error in size of the multilayer material, thereby preventing the stretching of the belt. The diaphragm is ordinarily made of a rubber sheet having a heat resistance and it must be stretched when pressured. However, when the filler sticks on the diaphragm, the portion of the diaphragm stuck with the filler is prevented from being stretched and portions adjacent to the stuck portion are stretched excessively for compensating for the non-stretchable portion of the belt. Accordingly, the portions stretched excessively tend to deteriorate, and ruptured portion occurs in the belt from these portions when it is used repeatedly. When the air is introduced into the upper chamber, the air flows into the lower chamber through the ruptured portion so that vacuum degree deteriorates and a difference in pressure between the upper chamber and the lower chamber can not be kept sufficiently high. As a result, the pressure becomes insufficient and the multilayer material becomes an inferior goods.

In the present invention, a brush or brushes are caused to contact with the conveying belt or both the conveying belt and the covering belt so that the filler stacked on the belt or belts is removed therefrom, thereby improving the durability of the belt or belts.

In the above invention, the conveying belt without hole in the conveyor apparatus is given the releasing function. Instead of this configuration, the present invention may be configured such that a belt having a plurality of holes communicating with the lower chamber is disposed under the multilayer material as the conveying means and all four side edges of the chamber are covered with the belt. Also, the covering belt can be structured in the same manner as the conveying belt.

Also, in order to implement the releasing function on the upper side of the above multilayer material, the present invention can be configured such that rolls around which a belt is wound is provided on the conveying-in side of the laminator and the conveying-out side thereof, respectively, and the belt is paid out from one of the rolls and is taken up on the other of the rolls.

Furthermore, the present invention can be configured such that the belt is formed in a loop configuration and passes in between the upper chamber and the lower chamber of the laminator.

The separable and connectable portion of the belt has a thickness larger than the other portion of the belt. When this portion is sandwiched or clinched between the lid and the vacuum vessel of the laminator, vacuum may be leaked depending upon the type of the sealing member when the lower chamber is evacuated. In order to prevent such a drawback, detecting means for detecting the connected or joined portion of the belt and detecting means for detecting an amount of movement of the belt can be provided in this invention. When the connected portion of the belt is detected by the former detecting means and a predetermined amount of movement of the belt where the belt is not clinched is detected by the latter detecting means, the belt is stopped. Thus, the multilayer material can be conveyed up to a position where the connected portion is not clinched between the lid and the vacuum vessel.

In the above case, the present invention may be configured such that a belt conveyance actuation switch is provided and an operator of the apparatus confirms the positions of the connected portion of the conveying belt and the multilayer material with his/her eyes so that he/she turns off the switch to stop the conveying belt. Thus, the belt can be stopped at a position where the connected portion is not clinched between the lid and the vacuum vessel.

BRIEF DESCRIPTION OF THE DRAWINGS

FIG. 17 is a diagram showing another example shown in FIG. 16.

DESCRIPTION OF THE PREFERRED EMBODIMENT

Figure 1:
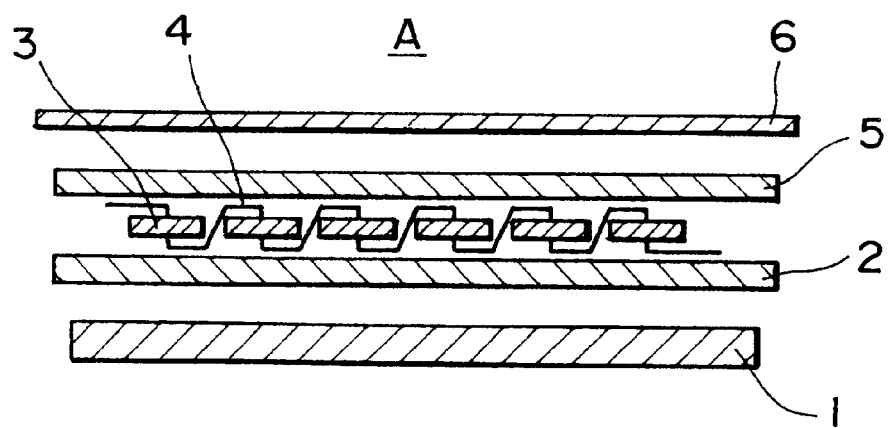
FIG. 1 is a sectional view showing a configuration of a multilayer material to be processed.
Figure 2:
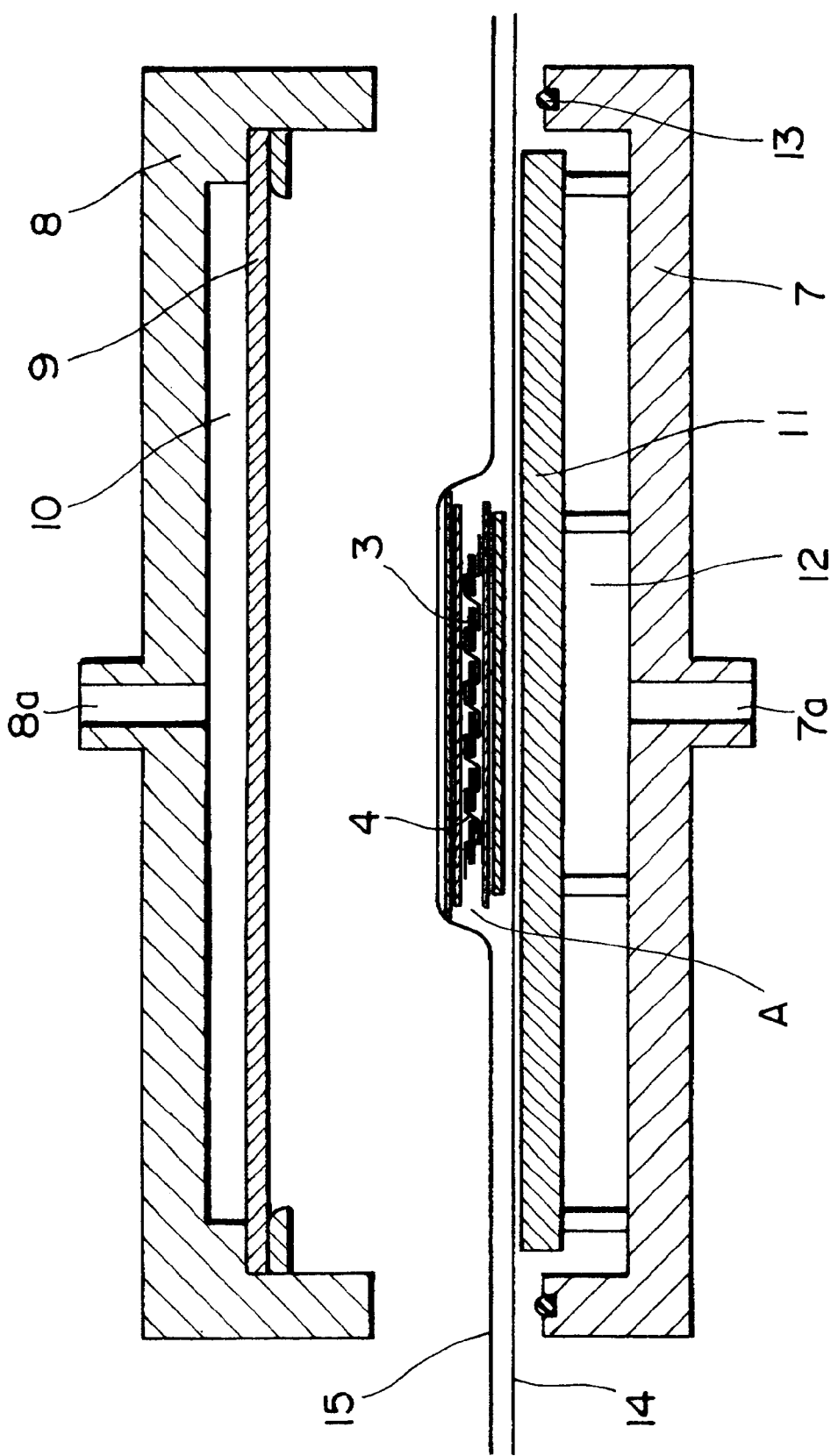
FIG. 2 is a sectional view of a laminator in a state where a lid is opened.
Figure 3:
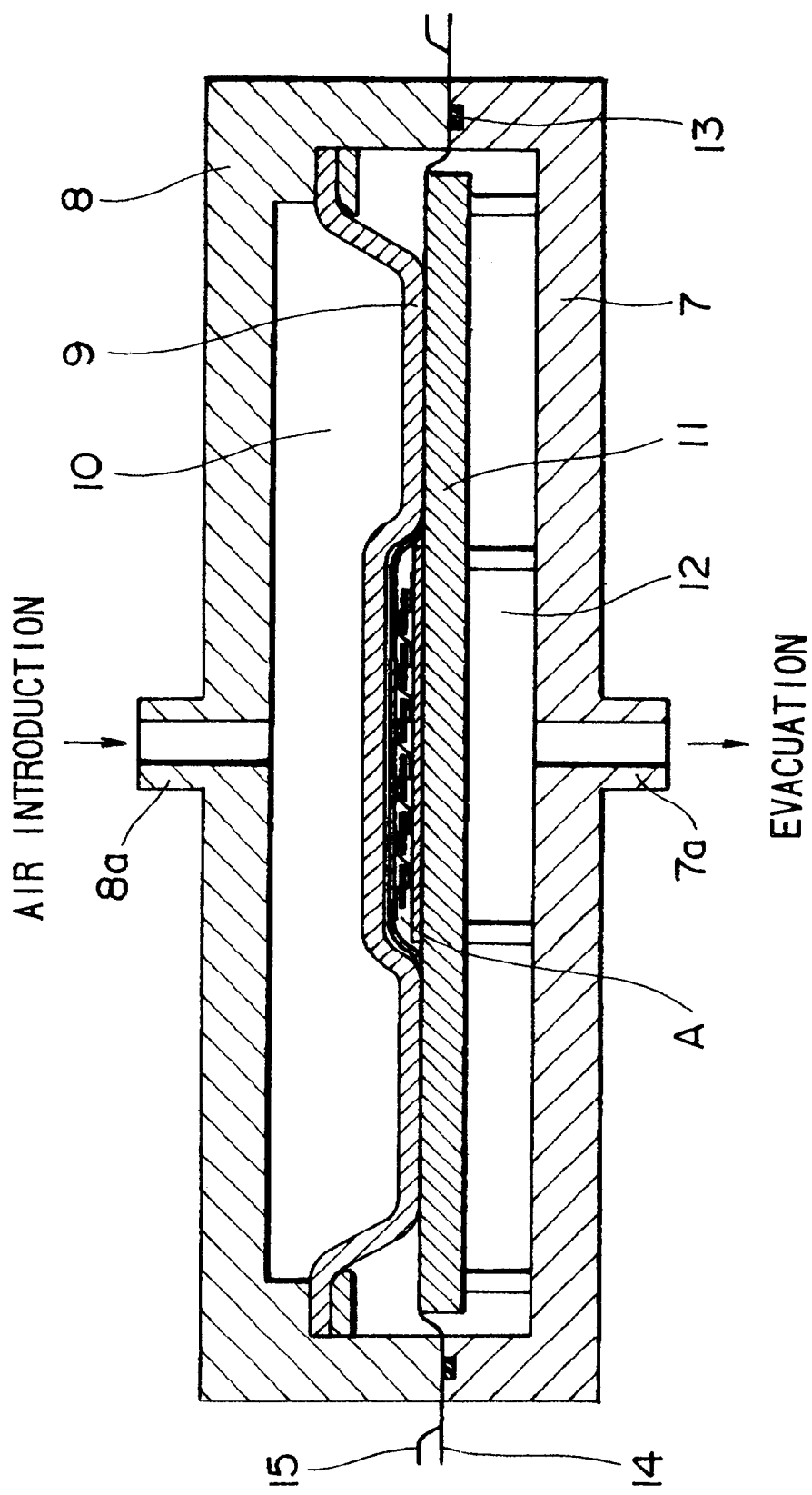
FIG. 3 is a sectional view in a state where the lid is closed from the state shown in FIG. 2, a lower chamber is evacuated, an upper chamber is introduced with the air, and the multilayer material is pressed against a heating plate by a diaphragm.
Figure 4:
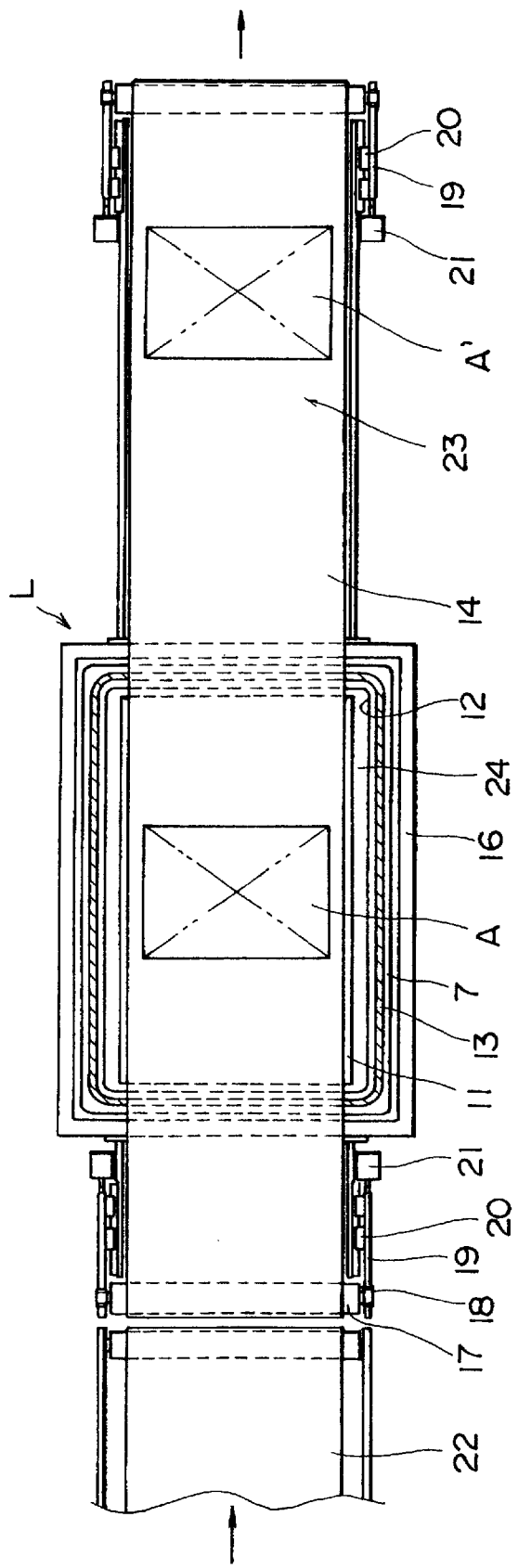
FIG. 4 is a plan view of a conveying belt according to the present invention.
Figure 5:
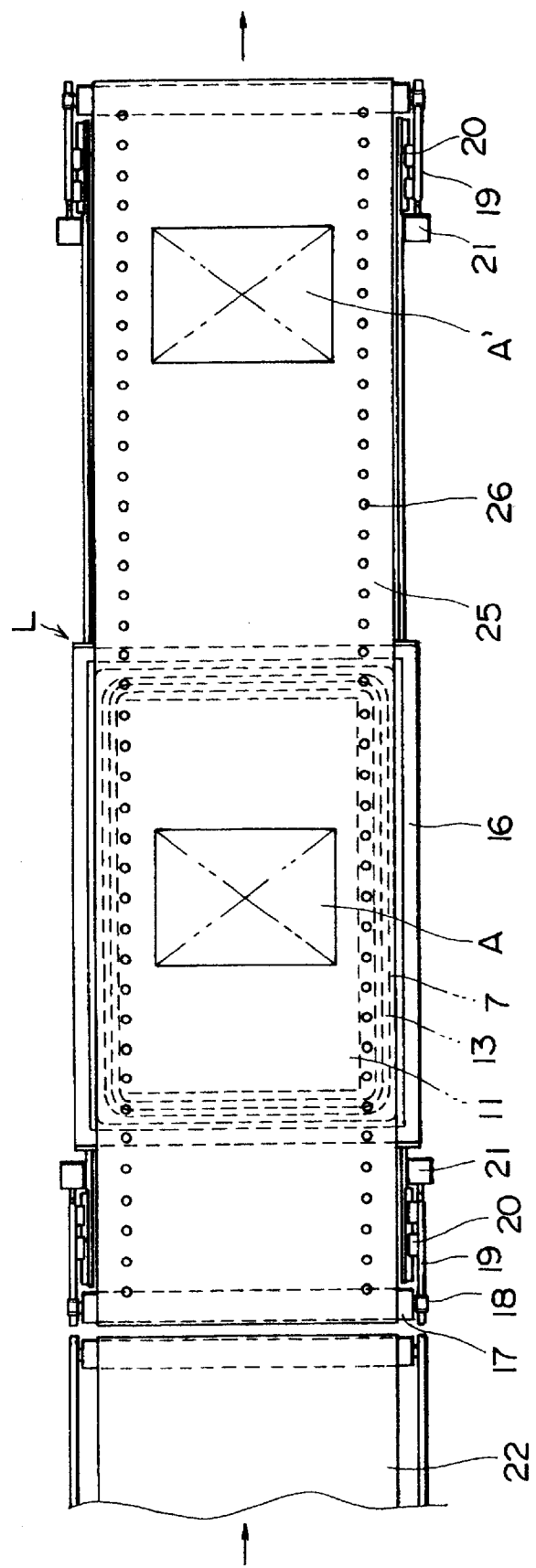
FIG. 5 is a plan view of another example of the conveying belt.
Figure 6:
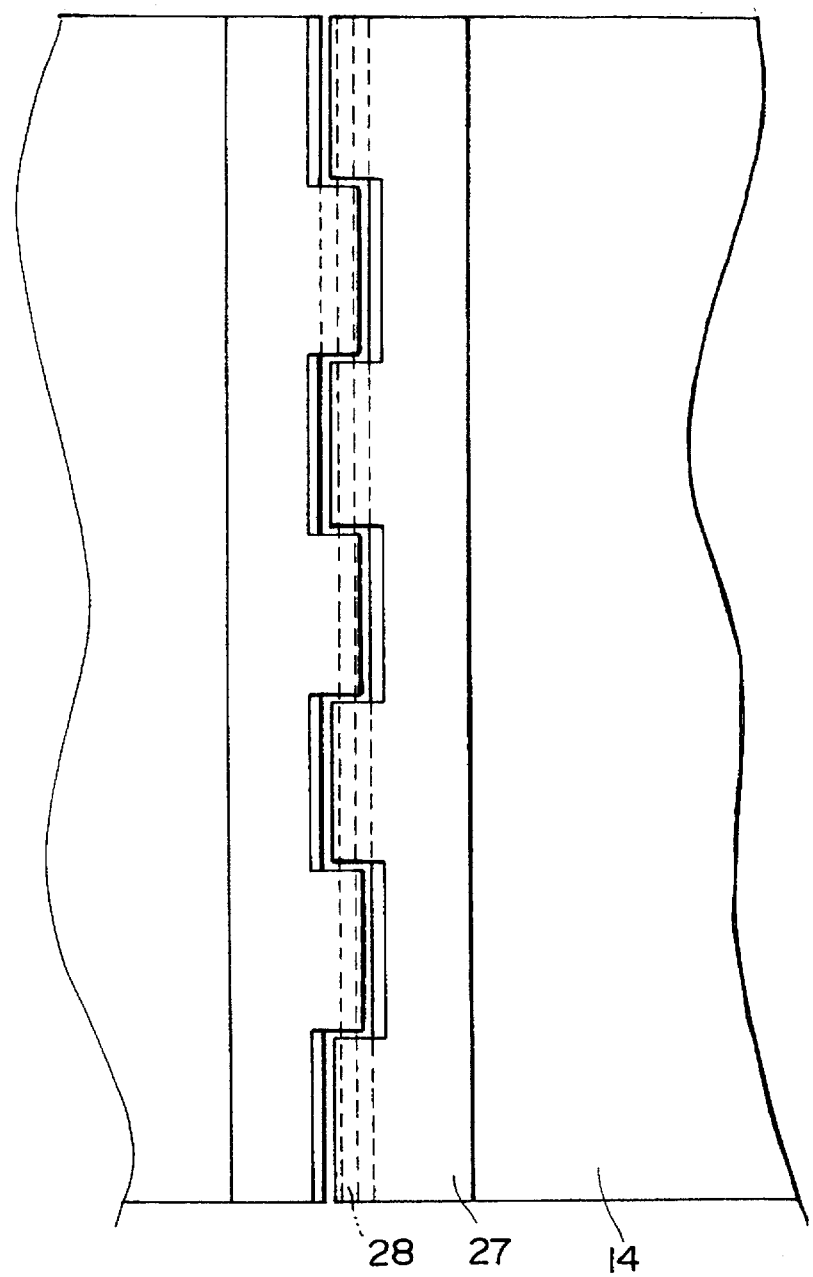
FIG. 6 is a plan view of a joined portion of the conveying belt.
Figure 7:
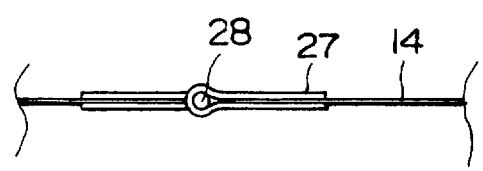
FIG. 7 is a side view of the joined portion shown in FIG. 6.
Figure 8:
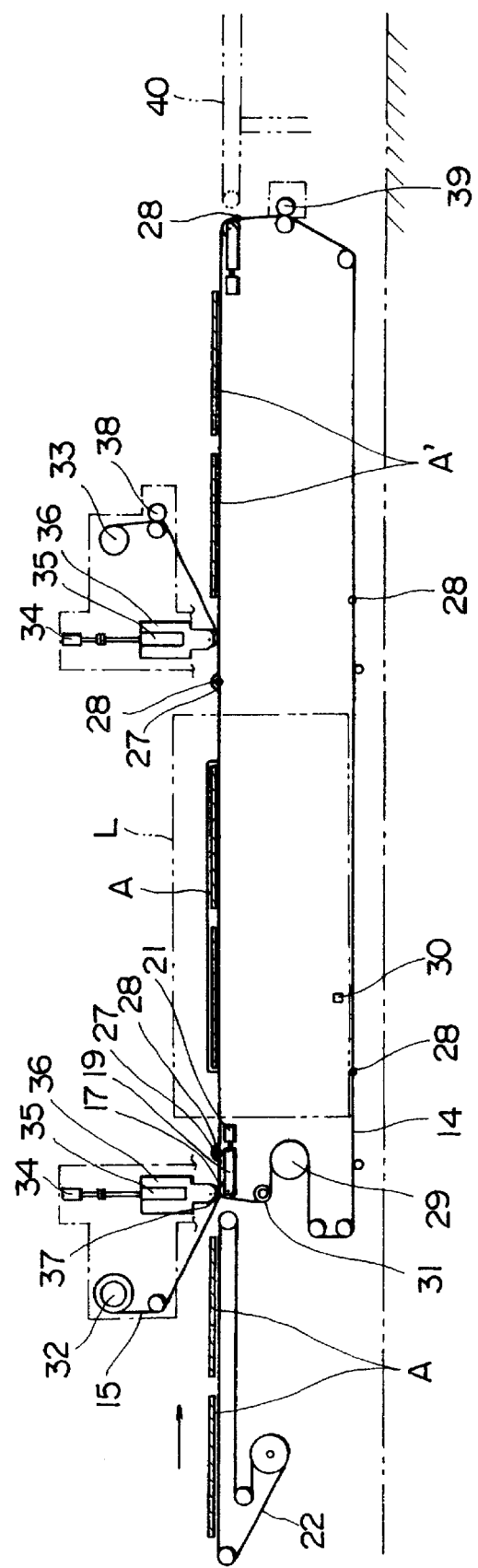
FIG. 8 is a diagram showing a conveying state of one example of a conveyor apparatus according to the present invention.
Figure 9:
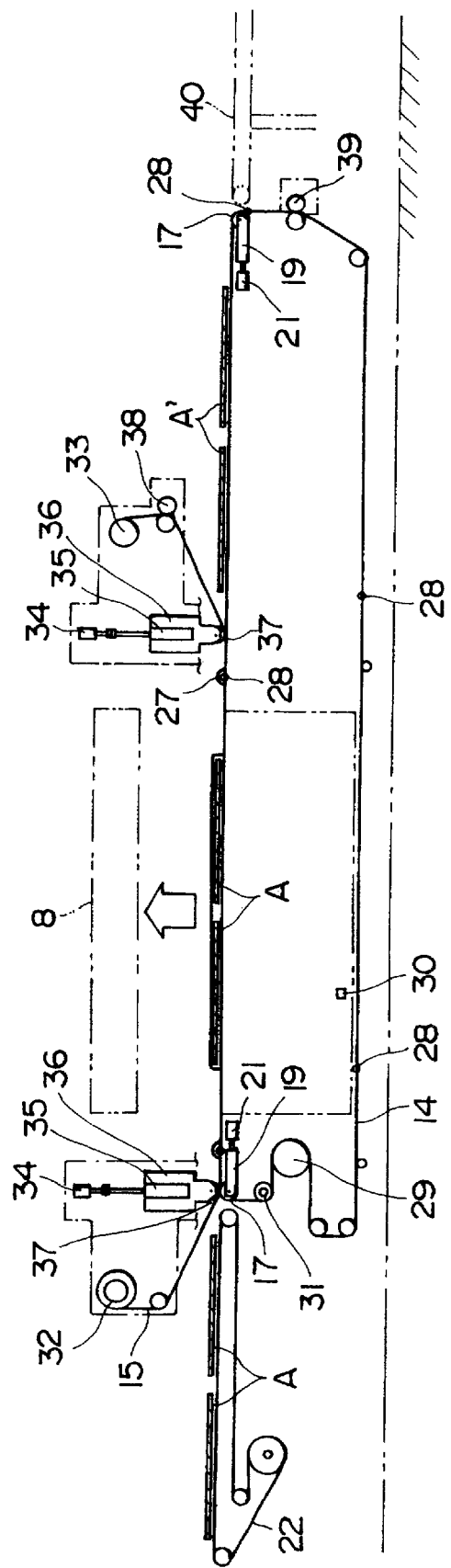
FIG. 9 is a diagram showing a state where the lid is opened after processing has been finished from the state shown in FIG. 8.
Figure 10:
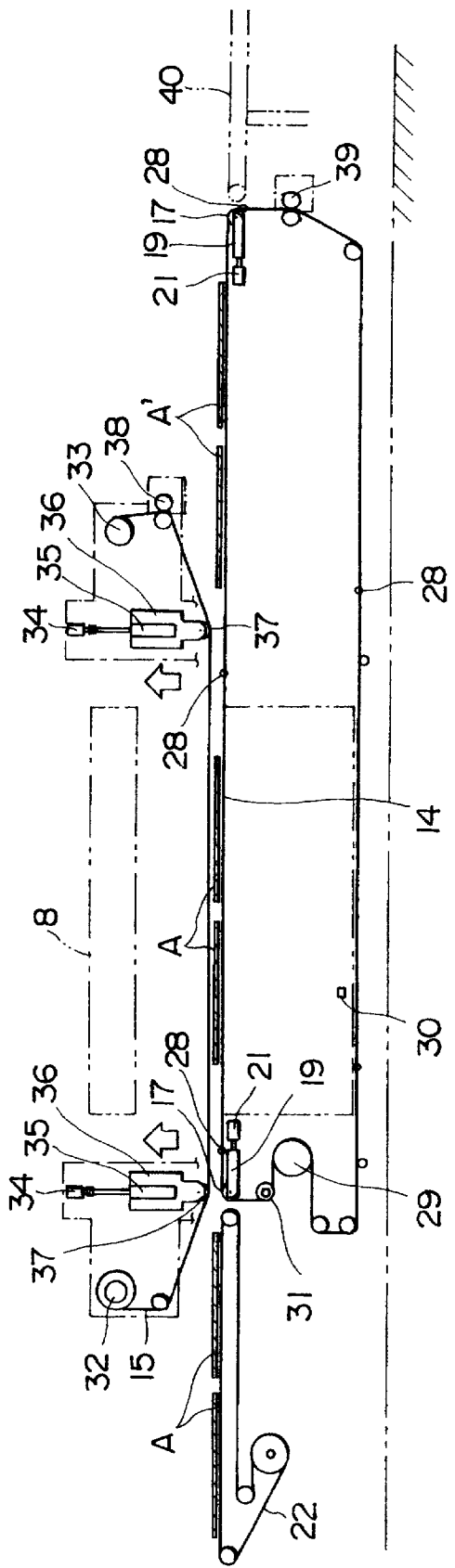
FIG. 10 is a diagram showing a state where a covering belt is slightly lifted from the state shown in FIG. 9.
Figure 11:
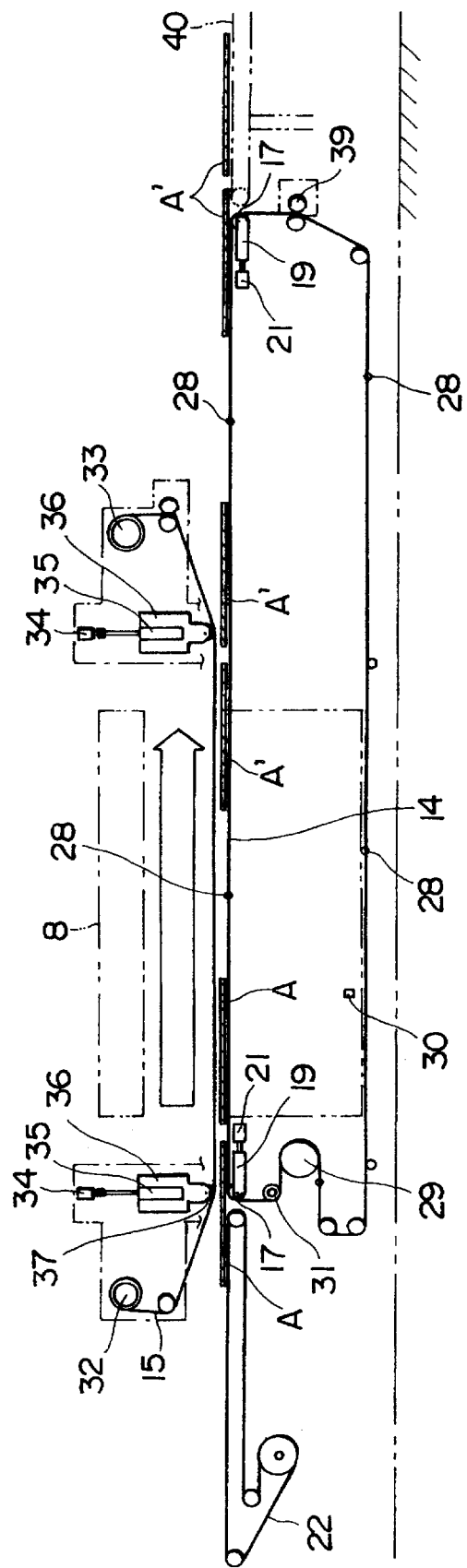
FIG. 11 is a diagram showing a state where multilayer materials are being conveyed from the state shown in FIG. 10.
Figure 12:
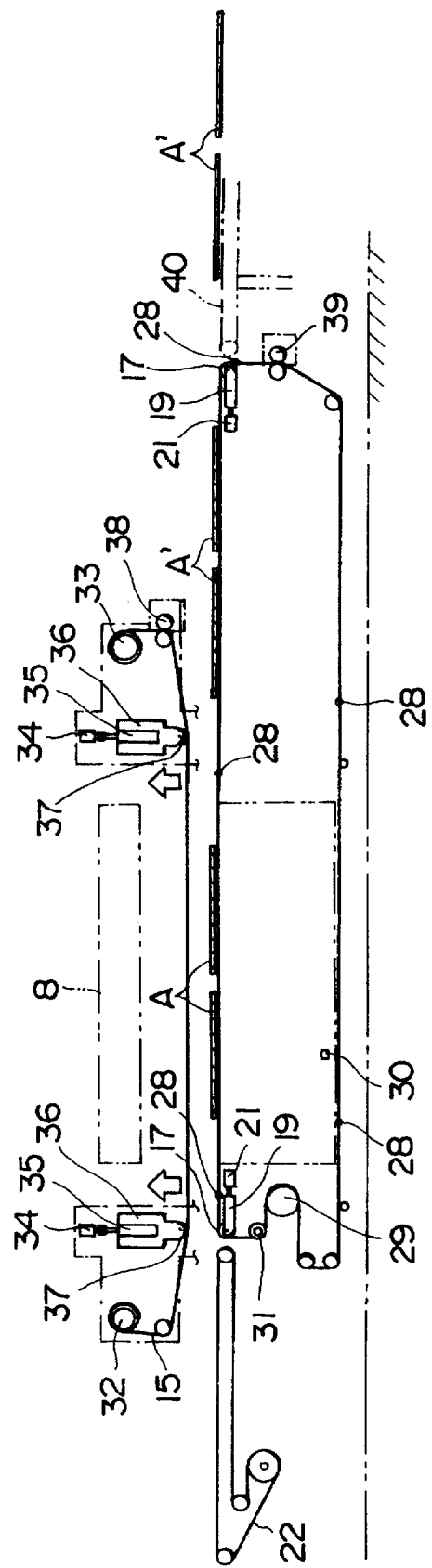
FIG. 12 is a diagram showing a state where the covering belt is further lifted at a position higher than that of the state shown in FIG. 11.
Figure 13:
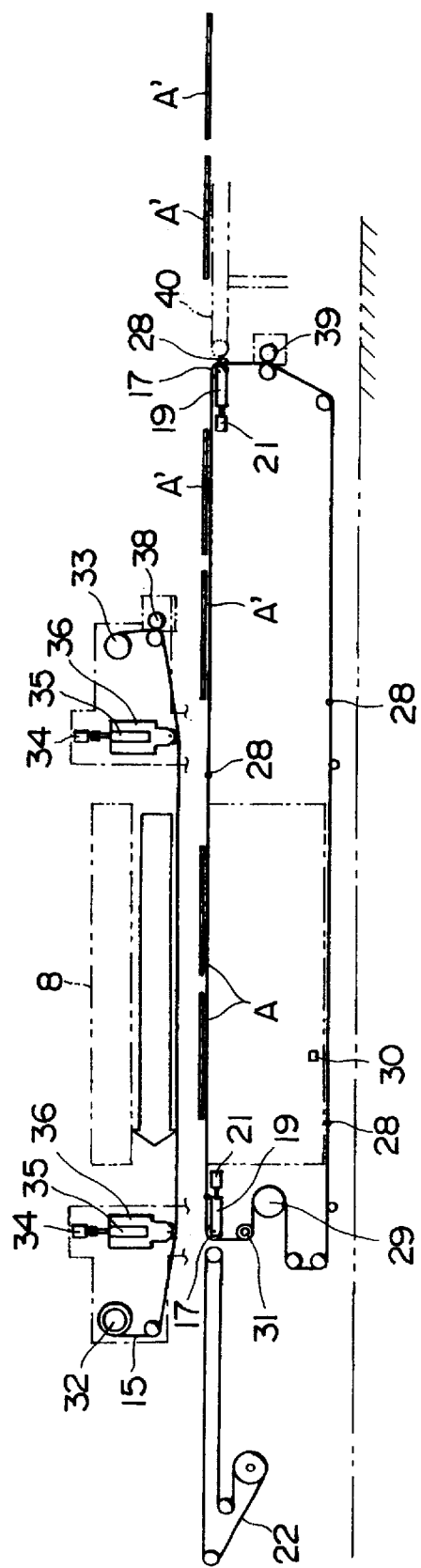
FIG. 13 is a diagram showing a state where the covering belt is rewound from the state shown in FIG. 12.
Figure 14:
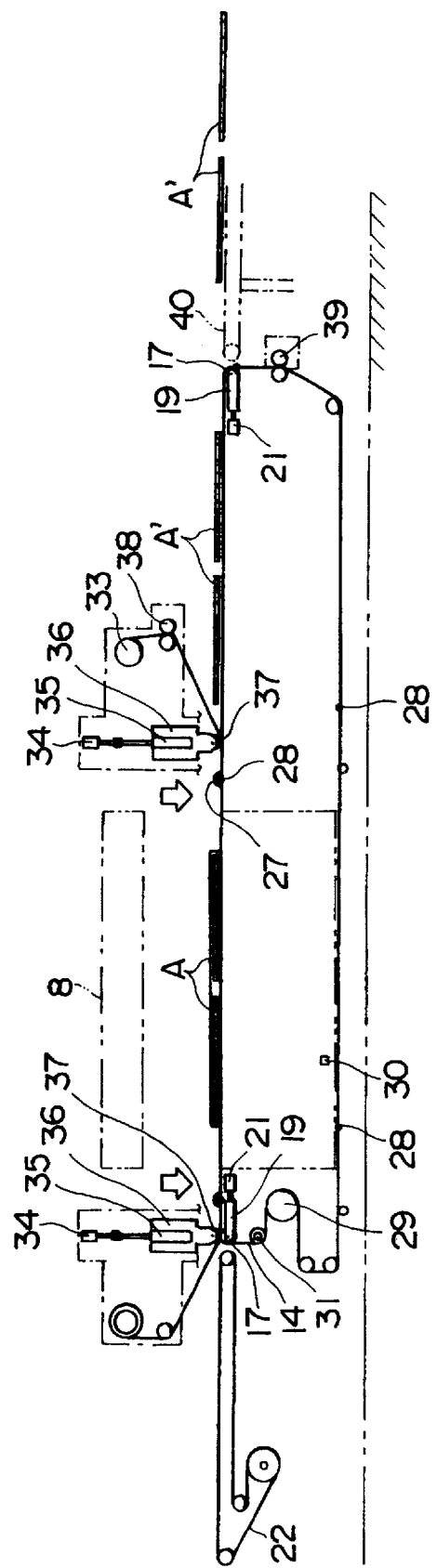
FIG. 14 is a diagram showing a state where the conveying belt is lowered to its original position from the state shown in FIG. 13.
Figure 15:
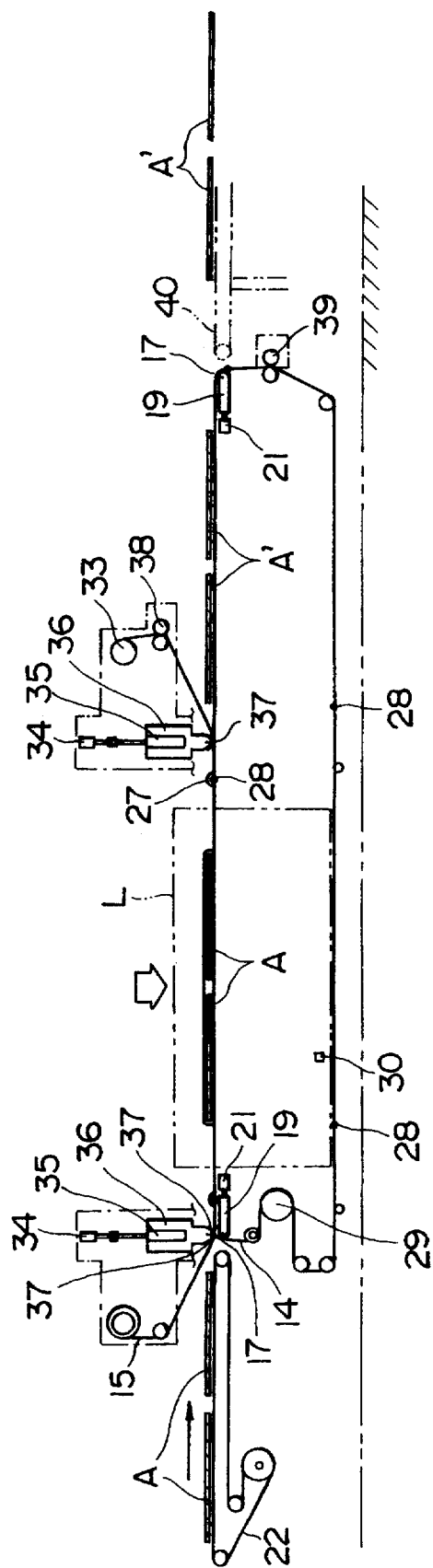
FIG. 15 is a diagram showing a state where the lid is closed from the state shown in FIG. 14.
Figure 16:
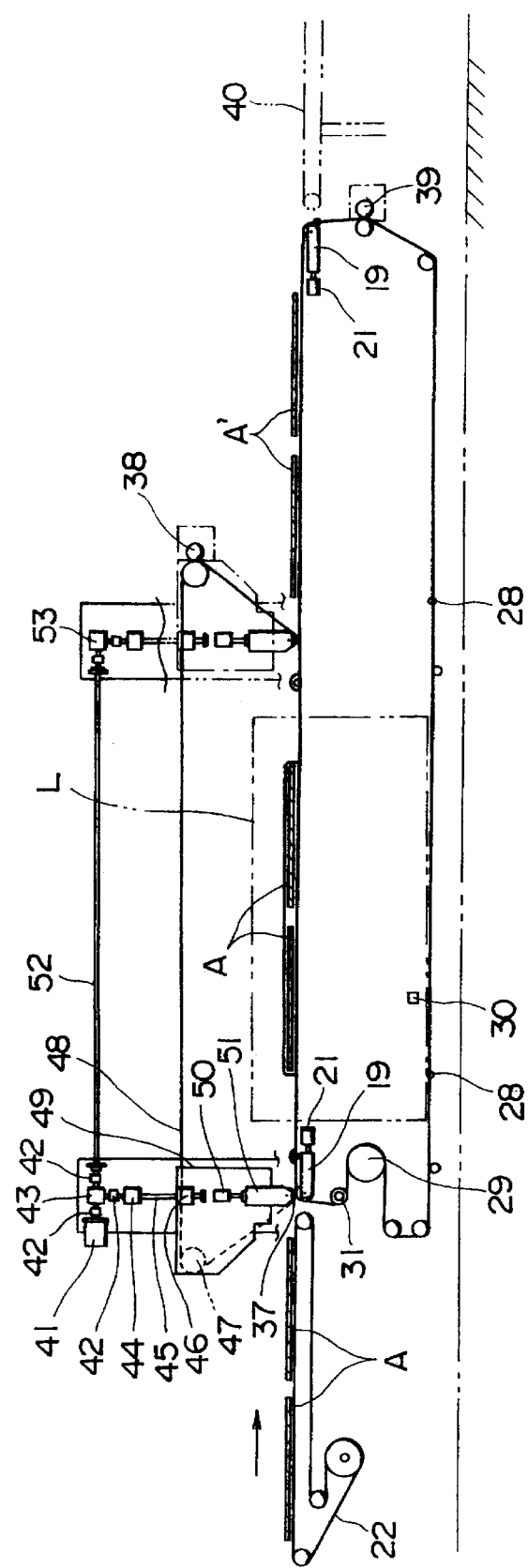
FIG. 16 is a diagram showing an example where the covering belt is formed in a loop.

Next, an embodiment of the present invention will be explained with reference to the drawings of an example where a laminator for photovoltaic modules is used as a laminator. FIG. 1 is a sectional view showing a configuration of a multilayer material to be processed; FIG. 2 is a sectional view in a state where a lid is open; FIG. 3 is a sectional view in a state where the lid is closed from the state shown in FIG. 2, a lower chamber is evacuated, an upper chamber is introduced with the air, and the multilayer material is pressed against a heating plate by a diaphragm; FIG. 4 is a plan view of a conveying belt according to the present invention; FIG. 5 is a plan view of another example of FIG. 4; FIG. 6 is a plan view of a joined portion of the conveying belt; FIG. 7 is a side view of the joined portion of FIG. 6; FIG. 8 is a diagram showing a conveying state of one example of a conveyor apparatus according to the present invention; FIG. 9 is a diagram showing a state where the lid is opened after processing has been finished from the state shown in FIG. 8; FIG. 10 is a diagram showing a state where a covering belt is slightly lifted from the state shown in FIG. 9; FIG. 11 is a diagram showing a state where multilayer materials are being conveyed from the state shown in FIG. 10; FIG. 12 is a diagram showing a state where the covering belt is further lifted at a position higher than that of the state shown in FIG. 11; FIG. 13 is a diagram showing a state where the covering belt is rewound from the state shown in FIG. 12; FIG. 14 is a diagram showing a state where the conveying belt is lowered to its original position from the state shown in FIG. 13; FIG. 15 is a diagram showing a state where the lid is closed from the state shown in FIG. 14; FIG. 16 is a diagram showing an example where the covering belt is formed in a loop; and FIG. 17 is a diagram showing another example of FIG. 16.

In FIG. 1, reference character A denotes a multilayer material to be laminated and the multilayer material is configured such that a sheet-like filler 2, photovoltaic modules 3 and another sheet-like filler 5 are sequentially stacked on a lowermost glass plate 1 and a backing member 6 is disposed at an uppermost position. Reference numeral 4 denotes a ribbon-like electrode connecting the photovoltaic modules 3.

In FIGS. 2 and 3, reference numeral 7 denotes a vacuum vessel, 8 denotes a lid of the vacuum vessel 7, 9 denotes a diaphragm mounted to the lid 8, 10 denotes an upper chamber formed by the lid 8 and the diaphragm 9, 11 denotes a heating plate mounted to the vacuum vessel 7, and 12 denotes a lower chamber formed by the vacuum vessel 7 and the diaphragm 9. The vacuum vessel 7 can be put in an airtight situation by closing the lid 8 through a sealing member 13. Reference numeral 7a denotes a pipe connecting port of the vacuum vessel 7, 8a denotes a pipe connecting port of the lid 8, and both the connecting ports 7a and 8a are for evacuation and introduction of the air. The conventional laminator is configured with the above elements. In this configuration, the multilayer material A is placed on the heating plate 11, and the vacuum vessel 7 is closed by the lid 8 as shown in FIG. 3. Then, the multilayer material A is heated by the heating plate 11 and the vacuum vessel 7 is evacuated, so that the multilayer material A is pressed on the heating plate 11 by the diaphragm 9. The fillers 2 and 5 are melted by heat of the heating plate 11 and the multilayer material A is degassed so that the multilayer material is formed in a laminated body. Finally, the lid 8 is opened and the laminated body is taken out. On the other hand, in the present invention, a lower side belt 14 for conveyance is disposed between the heating plate 11 and the multilayer material A and the multilayer material A which has been laminated is conveyed by the lower side belt 14.

As shown in FIG. 4, the lower side belt 14 passes through only two side edges of all four side edges of the chamber 12 opposed to each other along a direction of conveyance of the multilayer material. Therefore, when the lid 8 of the vacuum chamber 7 is closed, the two portions, along a widthwise direction, of the belt 14 are clinched between the lid 8 and the two side edges of the vacuum chamber 7 but two longitudinal edges of the belt 14 are not clinched, which allows the air to pass through. As a result, gas (the air) contained in the workpiece A can be removed, namely the multilayer material can be degassed when evacuation is effected in the lower chamber 12. Also, though the portions of the belt which have been clinched between the lid 8 are positioned across the sealing member 13, the flexibility and an amount of compression of the sealing member 13, and the thickness of the belt are properly set so that the air tightness can be prevented from being injured from these portions to such an extent that processing can be performed without problem. As mentioned above, the amount of compression of the sealing member 13 is approximately several millimeters, and the thickness of the belt 14 is in a range of about 0.1 to 0.5 mm.

Furthermore, the belt 14 is preferably made of a glass cloth sheet immersed in fluoric resin having a releasing function. The reason is because, when the fillers 2 and 5 are heated to melt by the heating plate 11 in a laminating processing, they overflow to stick on the heating plate 11, causing the above-mentioned drawback. In the present invention, since the overflowed filler 2, 3 material sticks on the lower side belt 14, such a problem as that in the conventional art can be solved.

Reference numeral 15 denotes an upper side or covering belt for covering the multilayer material A having a structure similar to that of the lower side belt 14 and a releasing function. The upper side belt 15 is for preventing the melted and overflowed filler 2 and 5 from sticking on the diaphragm 9 during the laminating processing.

In FIG. 4, reference numeral 16 denotes a frame of a laminator L, 17 denotes a roller for the lower side belt, 18 denotes a spherical surface bearing, 19 denotes a bracket for the lower side belt, 20 denotes an upstanding guide for the lower side belt, 21 denotes a cylinder for the lower side belt, 22 denotes a carrying-in conveyor, 23 denotes a section where the processed multilayer material A' on the lower side belt 14 is cooled naturally, and 24 denotes a flow path for gas in the lower chamber 12.

FIG. 5 is a plan view showing an example where a perforated belt 25 having rows of holes 26 along both longitudinal side edges thereof is used instead of the lower side belt 14. With use of the perforated belt 25, even when the four side edges of the chamber 12 are covered, the holes 26 serve as flow paths for gas so that the multilayer material A can be degassed during the laminating processing.

FIG. 6 is a plan view of a join or seam portion of the lower side belt 14 and FIG. 7 is a front view of the join portion in FIG. 6, where reference numeral 27 denotes a hinge-like belt connecting member, 28 denotes a pin passing through the connecting member 27 and the join portion can be put in a separated state and can be put in a connected state by the pin 28.

FIGS. 8 to 15 illustrate implementation states where the multilayer material A is conveyed by the conveyor apparatus of the present invention. In these Figures, the upper side belt 15 is also used. The lower side belt 14 is connected at a plurality of portions to be formed in a loop configuration and it is driven by a driving roller 29 connected to such an actuator as a motor. Also, a join portion detector 30 for detecting the join or seam portion of the belt 14 is disposed in order to prevent the multilayer material A from riding on the join portion of the lower side belt 14 so that the seam portion of the belt 14 is detected by the detector 30. The amount of rotation of the roller 29 is measured by a rotation amount detector 31 for the roller 29 so that the belt 14 is driven until the movement amount of the belt 14 reaches a predetermined length, and it is stopped. Thereby, the multilayer material A can be conveyed up to a predetermined position within the laminator. A thickness measuring sensor or a color discriminating sensor can be used as the join portion detector 30 for the belt 14 as one example, and a pulse generator is used as the rotation amount detector 31 for the roller 29 as one example.

On the other hand, rollers around which the upper side belt 15 is wound are respectively provided on the carrying-in side and the carrying-out side of the conveyor apparatus. The belt 15 is unwound from one of the rollers and it is wound on the other. In FIG. 8, reference numeral 32 denotes a roll of the upper side belt on the carrying-in the side and 33 denotes a roll thereof on the carrying-out side. The rolls are respectively connected to motors, where torque control is effected on the roll on the carrying-out side and speed control is effected on the other roll on the carrying-in side, thereby making a conveyance of the upper side belt 15 possible. The tension of the belt 15 can be controlled by the above torque control.

Reference numeral 34 denotes a cylinder for the upper side belt, 35 denotes another cylinder for the upper side belt, 36 denotes a bracket for the upper side belt, 37 denotes a roller for the upper side belt, 38 denotes a brush for the upper side belt, and 39 denotes a brush for the lower side belt. The roller 37 for the upper side belt can be moved vertically by the cylinders 34, 35 for the upper side belt through the bracket 36 for the upper side belt so that the height of the upper side belt 15 can be changed. FIG. 8 also shows a state where the multilayer material A before processed is placed on the carrying-in conveyor 22, the multilayer material A is being processed in the laminator, and there is the multilayer material A' put during natural cooling is disposed on the carrying-out side. In this state, the brush 39 for the lower side belt contacts with the lower side belt 14 and the brush 38 for the upper side belt contacts with the upper side belt 15 so that the fillers 2 and 5 material sticking on the respective belts can be removed therefrom. In FIG. 8, reference numeral 40 denotes a carrying-out conveyor.

FIG. 9 shows a state where the lid 8 of the vacuum vessel 7 is opened from the state shown in FIG. 8 after the laminating processing is completed, and FIG. 10 shows a state where the upper side belt 15 is slightly lifted from the state shown in FIG. 9. At this time, it is preferable that the upper side belt 15 is not lifted excessively. The reason is because, when the upper side belt 15 is lifted excessively, assuming that the filler 5 material overflowing from the backing member 6 has stuck on the upper side belt 15, the filler 5 material is elongated or stretched in a string manner, thereby making it difficult to remove the elongated filler 5 material from the brush 38 for the upper side belt.

FIG. 11 shows a state where the multilayer materials A, A' are being conveyed from the state shown in FIG. 10. The fillers 2, 5 material sticking on the side lower side belt 14 and the side upper side belt 15 is removed therefrom by the brushes 39 and 38.

FIG. 12 shows a state where the upper side belt 15 is further lifted at a higher position from the state shown in FIG. 11, and FIG. 13 shows a state where the belt 15 is rewound from the state shown in FIG. 12.

FIG. 14 shows a state where the upper side belt 15 is lowered down tot its original position from the state shown in FIG. 13, that is the multilayer material A is covered with the belt 15, and FIG. 15 shows a state where the lid 8 is closed from the state shown in FIG. 14.

In the present invention, the upper side belt 15 shown in FIGS. 8 to 15 can be replaced with a loop-shaped belt. Namely, FIG. 16 shows an example where the upper side belt is formed in a loop configuration. In FIG. 16, reference numeral 41 denotes a motor for vertical movement, 42 denotes a coupling, 43 denotes a gearbox, 44 denotes a bearing unit, 45 denotes a screw, 46 denotes a nut screwed with the screw 45, 47 denotes an upper side roller driving roller, 48 denotes a looped or endless upper side belt, 49 denotes a vertical movement bracket attached with the nut 46, the driving roller 47, the cylinder 50 for the upper side belt and a bracket 51 for the upper side belt, 52 denotes a coupling shaft, and 53 denotes a gearbox. The roller 37 for the upper side belt can be moved vertically by the cylinder 50 and the bracket 51 through the vertical movement bracket 49, so that the tension of the upper side belt 48 can be loosened. Also, the vertical movement bracket 49 can be moved vertically by the screw 45 via the nut 46 which is driven by the motor 41 for vertical movement through the gearbox 43. Furthermore, the upper side belt 48 is driven to be conveyed by the driving motor 47. The drive of the driving roller 47 can be performed by a motor or the like.

FIG. 17 shows an example where the upper side belt 48 is formed in a loop configuration like that shown in FIG. 16. Difference in the configuration shown in FIG. 17 from that shown in FIG. 16 is that a fixed bracket 54 is used in place of the vertical movement bracket 49, the bracket 54 is attached with the driving roller 47, the cylinder 50 for the upper side belt and the bracket 51 for the upper side belt, and the bracket 51 is attached to the lid 8 of the laminator L via a coupling beam 55. The tension of the upper side belt 48 can be loosened like the above example, and the vertical movement of the belt 48 can be performed by opening/closing operation of the lid 8 as the related parts of the belt 48 are integrated with the belt 48.

In the above embodiment, though the present invention has been described about the conveyor apparatus in the laminator for photovoltaic modules, it is not limited thereto and is applicable to other laminatores. Also, the present invention is applicable to an apparatus where the lower side belt 14 is not provided and only the upper side belt 15 is provided. In this case, the multilayer material is placed on the sheetlike releasing member to be conveyed on to the heating plate 11.

As mentioned above, the present invention is a conveyor apparatus for conveying a multilayer material to be processed, used in a laminator having an upper chamber and a lower chamber partitioned by a diaphragm with or without a heating device disposed in the lower chamber, the conveyor apparatus being configured such that a conveying belt is disposed to pass through two side edges of all four side edges of each chamber opposed to each other along a conveying direction of the multilayer material; a belt provided with rows of holes communicating with the lower chamber along both longitudinal side edges of the belt is used as the conveying belt and the four side edges of the chamber are covered with the belt; or a covering belt is opposed to the conveying belt to cover the multilayer material and the multilayer material is conveyed in a state where it is sandwiched between the conveying belt and the covering belt. Further, the belt is given a release function, so that the problems in the conventional arts can be solved. When the present invention is applied to a laminator for photovoltaic modules, a photovoltaic modules having a much excellent quality can be obtained.

That is, in a laminator for a photovoltaic modules where a multilayer material configured such that a sheet-like filler, photovoltaic modules and a sheet-like filler are stacked sequentially on a glass plate which is the lowermost layer and a backing member is disposed at the uppermost portion is processed, when a belt or belts are disposed under the multilayer material or both under and above it and the multilayer material is subjected to heating-pressurizing processing, and laminating processing, even if the filler material overflows, the overflowed filler material sticks on the conveying belt or both the conveying belt and the covering belt but does not stick on the heating plate. Accordingly, since a work for removing the stuck filler material from the heating plate is not required, working efficiency is not only improved but also the quality of the photovoltaic modules obtained is enhanced.

What is claimed is:

1. A conveyor apparatus for conveying a multilayer material to be processed in a laminator having an upper chamber and a lower chamber partitioned by a diaphragm with or without a heating device disposed in the lower chamber, wherein a conveying belt is disposed in the lower chamber under the multilayer material along the conveying direction of the multilayer material, such that said conveying belt passes through only two opposing side edges of each chamber forming a passageway between the lower chamber above the conveyor belt and the lower chamber below the conveyor belt and a covering belt opposed to the conveying belt disposed above the multilayer material where said covering and conveying belt are adapted to reduce the adhesion of the multilayer material to the belts.

2. A conveyor apparatus according to claim 1, wherein said conveying belt is separable and connected at one or more portions.

3. A conveyor apparatus according to claim 2, including a detecting means for detecting said separable and connectable portion of the conveying belt and means for detecting an amount of movement of the conveying belt.

4. A conveyor apparatus according to claim 1, wherein a section for naturally cooling the multilayer material which has been heated in the laminator is provided on a carrying-out side of the conveying belt.

5. A conveyor apparatus according to claim 1, wherein the conveying belt is wound around a plurality of rollers, where at least one of the rollers is driven by an actuator, so that the tension of the conveying belt is controlled.

6. A conveyor apparatus according to claim 1, where at least one brush contacts each conveying and covering belt so that foreign matter is removed therefrom.

7. A conveyor apparatus for conveying a multilayer material to be processed in a laminator having an upper chamber and a lower chamber partitioned by a diaphragm with or without a heating device disposed in the lower chamber, wherein a conveying belt having a plurality of holes is disposed in the lower chamber under the multilayer material so as to cover the four side edges of each chamber forming a passageway between the lower chamber above the conveyor belt and the lower chamber below the conveyor belt to thereby permit gas in the mutilayer material to be evacuated into the lower chamber.

8. A conveyor apparatus according to claim 7, wherein said belt is separable and connected in one piece at one or more portions.

9. A conveyor apparatus according to claim 8 further comprising a detecting means for detecting a separable and connectable portion of the conveying belt and a means for detecting movement of the conveying belt.

10. A conveyor apparatus according to claim 7, wherein a section for naturally cooling the multilayer material which has been heated in the laminator is provided on a carrying-out side of the conveying belt.

11. A conveyor apparatus according to claim 7, wherein the conveying belt is wound around a plurality of rollers, at least one of the rollers is driven by an actuator, so that the tension of the conveying belt is controlled.

12. A conveyor apparatus according to claim 7, wherein at least one brush contacts each conveying and covering belt so that foreign matter is removed therefrom.

13. A conveyor apparatus for conveying a multilayer material to be processed in a laminator having an upper chamber and a lower chamber partitioned by a diaphragm with or without a heating device disposed in the lower chamber, wherein a conveying belt having a plurality of holes communicating with the lower chamber is disposed under the multilayer material so as to cover the four side edges of each chamber and a covering belt having a size covering the four side edges of the chamber and having a plurality of holes is disposed above the multiplayer material, the holes of the conveyor belt and the covering belt forming a passageway between the lower chamber above and below the conveyor belt and above and below the covering belt to thereby permit gas in the multilayer material to be evacuated into the lower chamber.

14. A conveyor apparatus according to claim 13, wherein a belt which is separable connected in one piece at one or more portions.

15. A conveyor apparatus according to claim 14, further comprising a detecting means for detecting a separable and connectable portion of the conveying belt and means for detecting an amount of movement of the belt.

16. A conveyor apparatus according to claim 13, wherein a section for naturally cooling the multilayer material which has been heated in the laminator is provided on a carrying-out side of the conveying belt.

17. A conveyor apparatus according to claim 13, wherein the conveying belt is wound around a plurality of rollers, at least one of the rollers is driven by an actuator, so that the tension of the conveying belt is controlled.

18. A conveyor apparatus according to claim 13, wherein one or more brushes contact with the conveying belt and the covering belt, and foreign matters attached to the belt or the belts are removed there from.

19. A conveyor apparatus for conveying a multilayer material to be processed in a laminator having an upper chamber and a lower chamber partitioned by a diaphragm with or without a heating device disposed in the lower chamber, wherein a covering belt providing a releasing function is movably disposed on an upper side of the multilayer material.

20. A conveyor apparatus for use in conveying a multilayer material to be processed in a laminator having an upper chamber and a lower chamber partitioned by a diaphragm, comprising:

a conveying belt disposed in the lower chamber under the multilayer material for moving the multiplayer material through the lower chamber, where the conveying belt comprises a glass cloth sheet immersed in a fluoric resin to thereby reduce the affinity of the multiplayer material to adhere to the conveyor belt;

a covering belt disposed in the lower chamber between the multilayer material and the diaphragm to prevent the adherence of the multilayer material to the diaphragm, where the covering belt comprises a glass cloth sheet immersed in a fluoric resin, means for removing air from the multilayer material as the material is conveyed through the lower chamber.

21. The conveyor apparatus of claim 20, wherein the means for removing air comprises a vacuum source connected to the lower chamber and holes along the length of the conveying belt forming a passageway from the multilayer material to the vacuum source.

* * * * *